Sept. 1, 1942.                M. DUNN                 2,294,840
                             SPECTACLES
                        Filed March 27, 1941
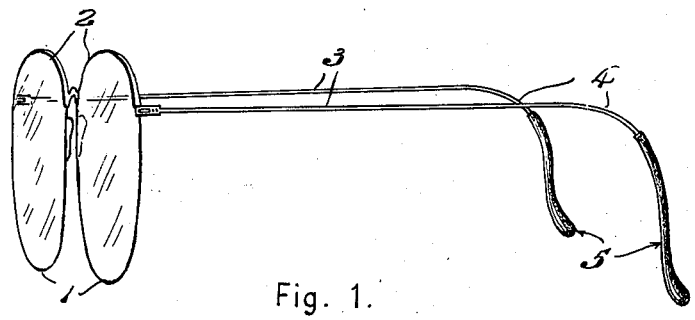
Fig. 1.
Fig. 4
Fig. 2.
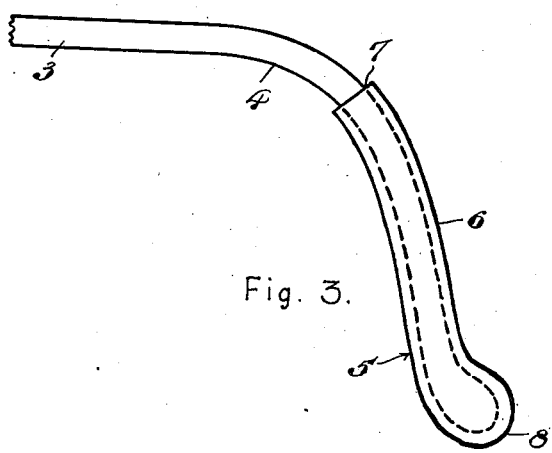
Fig. 3.
Witness:                              Maude Dunn INVENTOR.

Patented Sept. 1, 1942

2,294,840

UNITED STATES PATENT OFFICE 2,294,840

SPECTACLES

Maude Dunn, Birmingham, Ala.

Application March 27, 1941, Serial No. 385,427

1 Claim. (Cl. 88—52)

The object of the invention is to provide the ear engaging ends of the temples for spectacle rims, in a manner whereby they will be a protection for that part of the head behind the ears, from bruises, caused from the constant wear of the temples of the spectacles and to prevent the latter from slipping out of position when the temples are hooked around the ears.

In the drawing:

Figure 1 is a perspective view of a pair of spectacles having the temples thereof provided with protecting members in accordance with this invention, Figure 2 is a top plan view of a protecting member, Figure 3 is a side elevation of the ear engaging portion of a temple showing the adaptation therewith of a protecting member in accordance with this invention, and Figure 4 is a cross sectional view of the protecting member.

With reference to the drawing, 1 includes a pair of lenses, 2 rims or eyewires for the lenses 1, and 3 temple bars connected to the rims 2. The bars 3 are formed with the depending ear engaging portions or hooks 4. There is correlated with each ear engaging portion or hook 4 to obtain the protection aforesaid a protecting member 5 constructed from thin rubber and which is in the form of a cap. The member 5 consists of an elongated tubular body part 6 open at its inner end, as at 7, and closed at its outer end by the head 8. The member 5 possesses the characteristic whereby when it is arranged relatively to an ear engaging portion 4, it will snugly engage the latter. The body part 6 is mounted on the ear engaging portion 4 for the major part of the length of the latter and the outer end of such portion 4 is enclosed by the head 8. When the members 5 are mounted on the portions 4 of the temples and the spectacles are in position on the face of a person, the said members 5 will protect the back of the ears and that part of the head behind the ears from irritation, and further act to keep the spectacles firmly in place and constantly adjusted.

While I have herein shown and described a preferred embodiment of my invention, I would have it understood that changes may be made in the form, proportion and construction of the parts, without departing from the spirit, or idea of my invention and within the scope of the appended claim.

Having thus described my invention, I claim:

In spectacles and the like of that type having temples formed with depending ear engaging portions, a pair of readily removable substantially thin cap members of elastic material, each encompassing and snugly engaging one of said portions, each of said members including an elongated tubular body part open at its inner end and a head at its outer end, said cap members each having a longitudinal tread formed on the outer surface thereof, said body part completely enclosing only that part of the ear engaging portion of the temple that engages behind the head, and said head enclosing the outer end of said portion.

MAUDE DUNN.